United States Patent [19]
Detrick et al.

[11] Patent Number: 5,858,094
[45] Date of Patent: Jan. 12, 1999

[54] MACHINE SYSTEM AND PROCESS FOR PRODUCING ATTRITION RESISTANT SLOW RELEASE FERTILIZERS

[75] Inventors: John H. Detrick, Birmingham; Frederick T. Carney, Jr., Sylacauga, both of Ala.

[73] Assignee: RLC Technologies, L.L.C., Sylacauga, Ala.

[21] Appl. No.: 652,340

[22] Filed: May 22, 1996

Related U.S. Application Data

[63] Continuation of Ser. No. 356,572, Dec. 15, 1994, Pat. No. 5,547,486, which is a continuation of Ser. No. 14,519, Feb. 8, 1993, Pat. No. 5,374,292.

[51] Int. Cl.$^6$ ..................................................... B05B 17/00
[52] U.S. Cl. ........................... 118/303; 118/315; 118/418
[58] Field of Search .............................. 118/303, 19, 418, 118/313, 315; 71/64.02, 64.03, 64.07; 239/336, 398, 549; 427/212

[56] References Cited

U.S. PATENT DOCUMENTS 3,240,586  3/1966  Harris .......................................... 71/39

*Primary Examiner*—Donald E. Czaja
*Assistant Examiner*—Calvin Padgett
*Attorney, Agent, or Firm*—Breiner & Breiner

[57] ABSTRACT

A machine system and process for producing attrition resistant, controlled release fertilizer is described. In the process, a prewet solution is used to initially coat the plant nutrient to be coated followed by the separate application of the individual components used in the coating. The machine system provides an improved means for uniformly applying a single layer or multiple layers of polymer coatings to the plant nutrient.

3 Claims, 4 Drawing Sheets

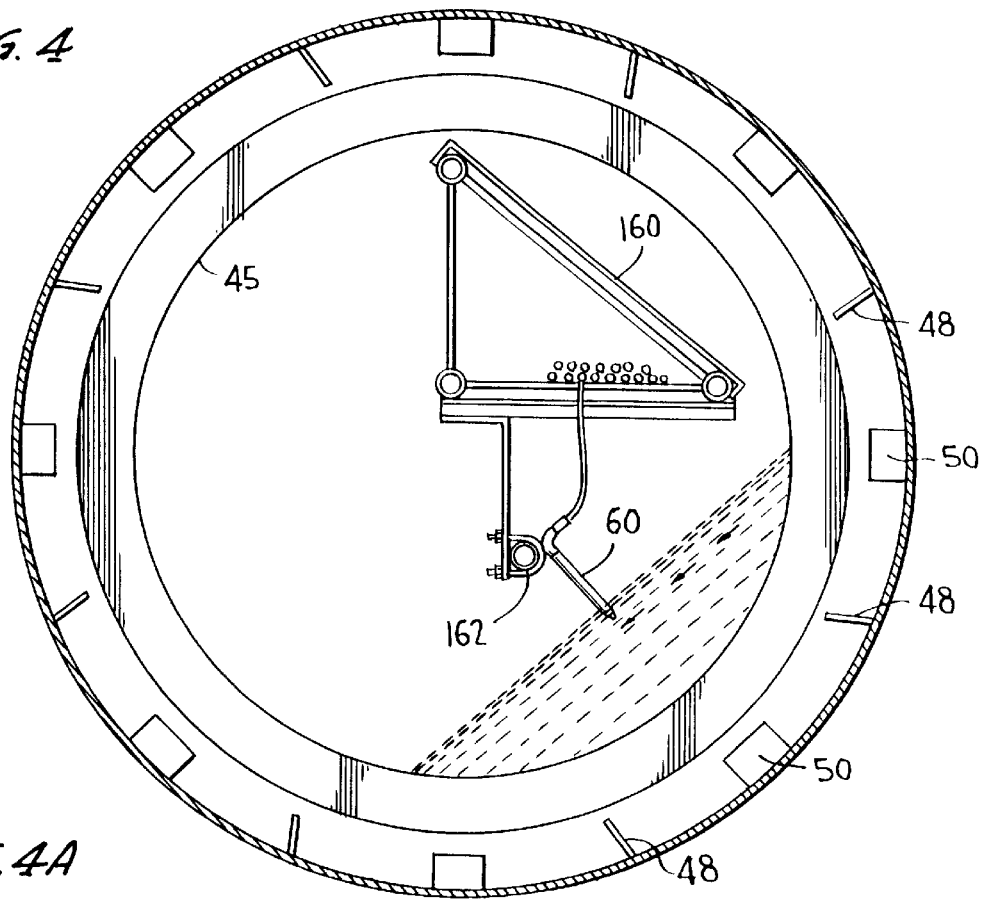
FIG. 4
FIG. 4A
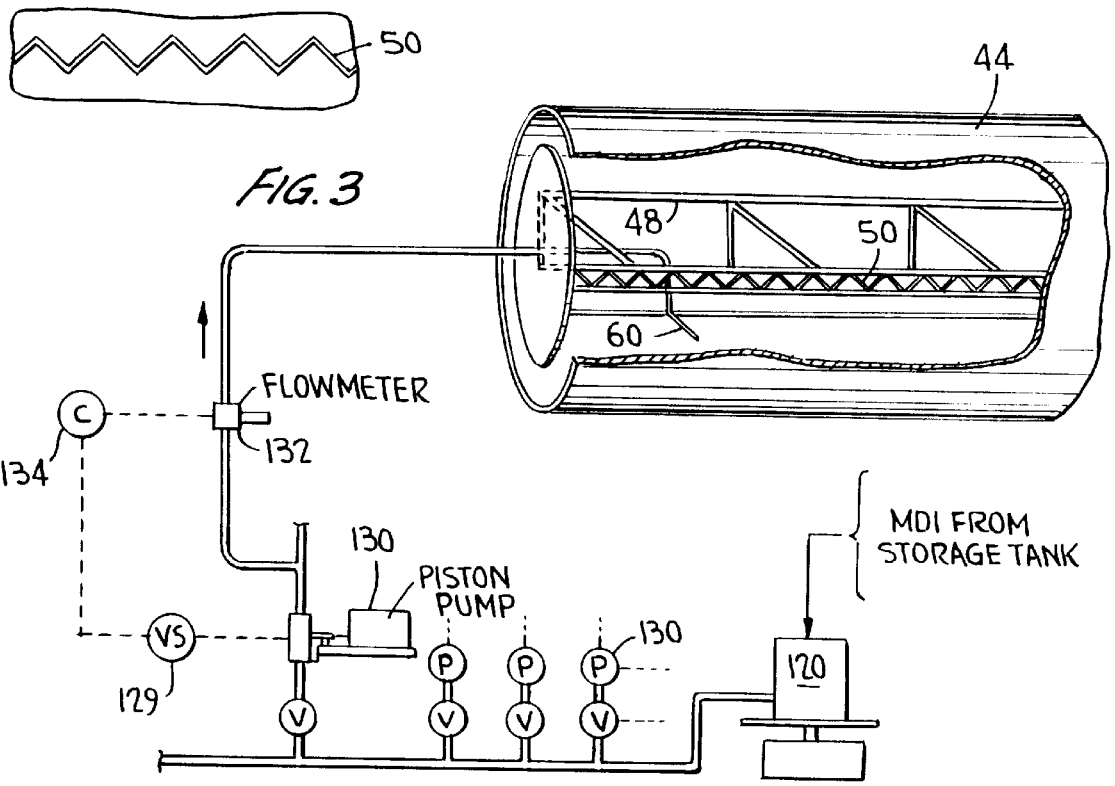
FIG. 3

MACHINE SYSTEM AND PROCESS FOR PRODUCING ATTRITION RESISTANT SLOW RELEASE FERTILIZERS

This is a continuation of application Ser. No. 08/356,572 filed Dec. 15, 1994, now U.S. Pat. No. 5,547,486 which in turn is a continuation of application Ser. No. 08/014,519 filed Feb. 8, 1993, now U.S. Pat. No. 5,374,292.

This invention is directed to an improved machine system and process for uniformly coating particulate granules with a coating material. More particularly, the invention is directed to an improved process for manufacturing attrition resistant, controlled release fertilizers by coating a particulate plant nutrient with a coating material which is chemically bonded to the nutrient, to provide a uniform coating that can be varied in thickness to effect various rates of release.

BACKGROUND OF THE INVENTION

Controlled release fertilizer particles which have remarkably high resistance to attrition and a method for their preparation are disclosed in Moore, U.S. Pat. Nos. 4,711,659 and 4,804,403. According to those patents, controlled release fertilizer particles are obtained by reacting a water-soluble central mass of plant food compound containing reactive functional groups such as urea, in particulate form, with a chemical coupling agent followed by reaction with a coating material, such as a polyol, to provide a water-insoluble polymer coating or sealing layer on the plant nutrient. The plant nutrient and sealing layer are chemically bonded to each other through the coupling agent. Specifically, the coupling agent reacts with and connects itself to functional group on a water-soluble central mass of plant nutrient to form generally a base coating having additional reactive groups. A water-insoluble coating or sealing layer then is bonded to the base coating through its reaction with the additional reactive groups on the base coat. Thereafter, multiple reacted layers of alternate applications of coupling agent and sealing layer are formed as a coating to a desired thickness. The coated fertilizer particles are highly resistant to attrition even under extreme vibration, impact and abrasion.

Although the coupling agent as described in the '403 patent can be any material which is reactive with the functional groups of the plant nutrient and with functional groups making up the water-insoluble coating, the polyisocyanates such as diphenylmethane diisocyanate, are preferred. Further, although the water-insoluble coating material can be any of various coating materials as described in the '403 patent, preferably the coating material is a polyol. The disclosure of the aforesaid '659 and '403 patents exclusively licensed to the assignee of the present application are incorporated herein by reference.

Although the aforesaid '659 and '403 patents provide highly advantageous slow release fertilizers, an improved system is desired to provide uniform coatings in the large quantities of fertilizers needed for commercial application.

SUMMARY OF THE INVENTION

In accordance with the improved machine system and process of the present invention, particulate plant nutrients are subjected to a pretreatment prior to reaction with a coupling agent such as an organic diisocyanate. The pretreatment subjects heated plant nutrient granules, such as urea granules, to water containing a polyol-catalyst, such as triethanolamine, and a water-soluble low molecular polyol, such as glycerine, followed by a further concurrent or sequential pretreatment with additional low molecular weight or medium molecular weight polyester polyol, which also contains a polyol-catalyst material and may contain additional water, prior to the application of excess coupling agent, such as an organic diisocyanate. This pretreatment is believed to raise the reactive functional groups of the particulate water-soluble plant nutrient at the particulate surface for enhanced molecular contact for rapid and more efficient subsequent reaction with the coupling agent. It has been found that not only is there better reaction at the surface of the nutrient with the coupling agent, but also the coating which subsequently is applied is more uniform on each granule.

Additionally, according to the present invention, a machine system is described, wherein the first surface coating on the plant nutrient is more uniformly applied, and, with it being possible to provide, in addition to the surface reacted polymer coating layer, one or more interlayers of a second non-reactive material, such as a wax, between additional, sequentially reacted layers of the polymer coating, which are formed after the first, surface applied polymer coating, in various coating thicknesses for various controlled release duration characteristics. Specifically, it has been found that the coating components are best applied to the plant nutrient granules by injecting separately and sequentially the plurality of coating components into a cascading mass of urea granules, which are moving continuously through a horizontal rotating cylindrical drum, immediately below the surface of the granules through a plurality of injectors with the flow characteristics of each injector being separately controlled. The cascading of the granules is in a controlled pattern which evenly distributes the injected liquid coating materials onto the plant nutrient surface. Heretofore, polymer and similar coatings primarily have been applied from spray nozzles or the like, normally as a mixture of all the components of the coating, such as resin coating material dissolved in a hydrocarbon solvent. Such spraying has been found to lead to clumping of particles and uneven application. Another advantage of injecting coating materials rather than spraying is the conservation of liquid materials utilized. Thus, there is no loss of materials due to ventilating air streams which can run as high as 30% depending on the type of spraying. This not only improves the economics of the system, but further reduces environmental concerns. Further, the machine system in applying the coating materials by injection preferably utilizes individual piston pumps having individually controlled flow characteristics for each injector which injects a separate coating component. This provides for more uniform control of the application quantity and the correct chemical reaction ratio of the coating materials to the granules being coated. Since the coating materials will react fully and most rapidly when injected onto the granule surface within a stoichiometric chemical ratio range, the reaction rate is slowed, to permit uniform flow of unreacted chemicals, by injecting a triplet sequence of diisocyanate-polyol-diisocyanate. When the first two of the triplet are injected in sequence onto the granule surface, the polymerization rate is slow since the polyol is in great excess. The third injection of the triplet completes the polymerization reaction.

The invention, therefore, comprises an improved coating process and a machine system for applying the improved coating.

The advantages of the present invention will be more readily apparent from the drawing, which describes in detail a presently preferred commercial embodiment.

DESCRIPTION OF THE DRAWING

FIG. 3 is a schematic of a typical pump tank shown in FIG. 2 feeding a plurality of piston pumps for supplying one of the coating components to injectors in the coating drum of FIG. 1;

FIG. 4 is a cross-sectional view looking from the exit end of the drum of FIG. 1 toward the entrance end;

FIG. 4A is a plan view of a section of the Z-flights of FIG. 4;

Referring to FIGS. 1A and 1B, the machine system comprises one or a plurality of raw material storage tanks 10 which feed raw material through a pneumatic gate 12 onto a first conveyor 14, to a second conveyor 16, to an elevator 18. The elevator then delivers raw material onto a third conveyor 20 which delivers the raw material onto a sizing screen 22 for separation of oversized and undersized particles of plant nutrient. Hereinafter, the plant nutrient will at times be referred to for convenience as "urea," which is a preferred plant nutrient to be coated.

Figure 1A:
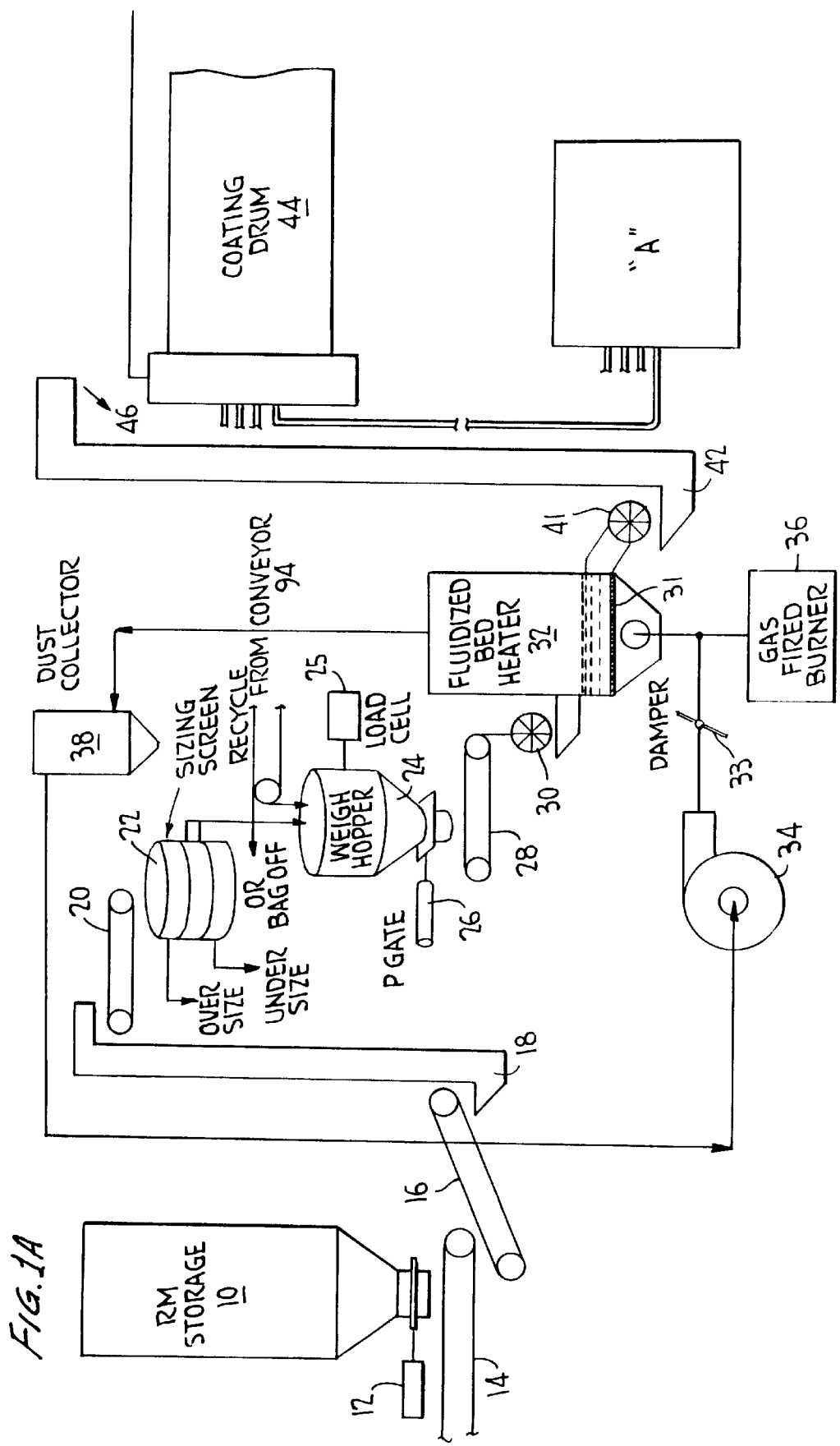
FIGS. 1A and 1B illustrate a flow diagram of the overall coating system commencing with the raw material storage for the nutrient being coated through the collection of the coated nutrient in storage.

The properly sized urea is fed into a weight hopper 24 suspended by load cells 25 for weighing and delivery through a pneumatic gate 26 to a weigh belt feeder 28, i.e., weight being determined by weight times speed. The urea is then fed through a rotating air lock gate 30 into a heated fluidized bed 32 having a perforated screen 31 for carrying the urea particles. The fluidized bed 32 is heated with air from blower 34 which is directly heated in a duct having damper 33 to about 170° F. with a gas fired burner 36 which provides heated air in the fluidized bed of about 210° F. The dust from the fluidized bed is collected in dust collector 38, with heated air being recirculated through line 40 to blower 34. The recirculated air entering blower 34 is at a temperature of about 160° F. The heated urea is then fed onto an elevator 42 through air lock gate 41 for delivery to one of the two coating drums 44 or 46. The two drums are used alternately so as to permit cleaning or repair of a drum without need to close down the coating operation.

Drums 44 and 46, which are preferably six feet in diameter and 30 feet long, are rotated by motor and shaft means, not shown. The interior of the drum, as best shown in FIGS. 3, 4 and 4A, has alternating straight flights 48 and Z-flights 50. There are eight straight flights and eight Z-flights, each six inches in height, evenly spaced around the circumference of the drum. These alternating flights are designed so that the material being coated flows over the end of the flights and in contact with injectors 60, as shown in FIG. 4, to permit continuous and uniform application of a coating component from the injectors onto the urea, as will be further defined hereinafter.

Figure 1B:
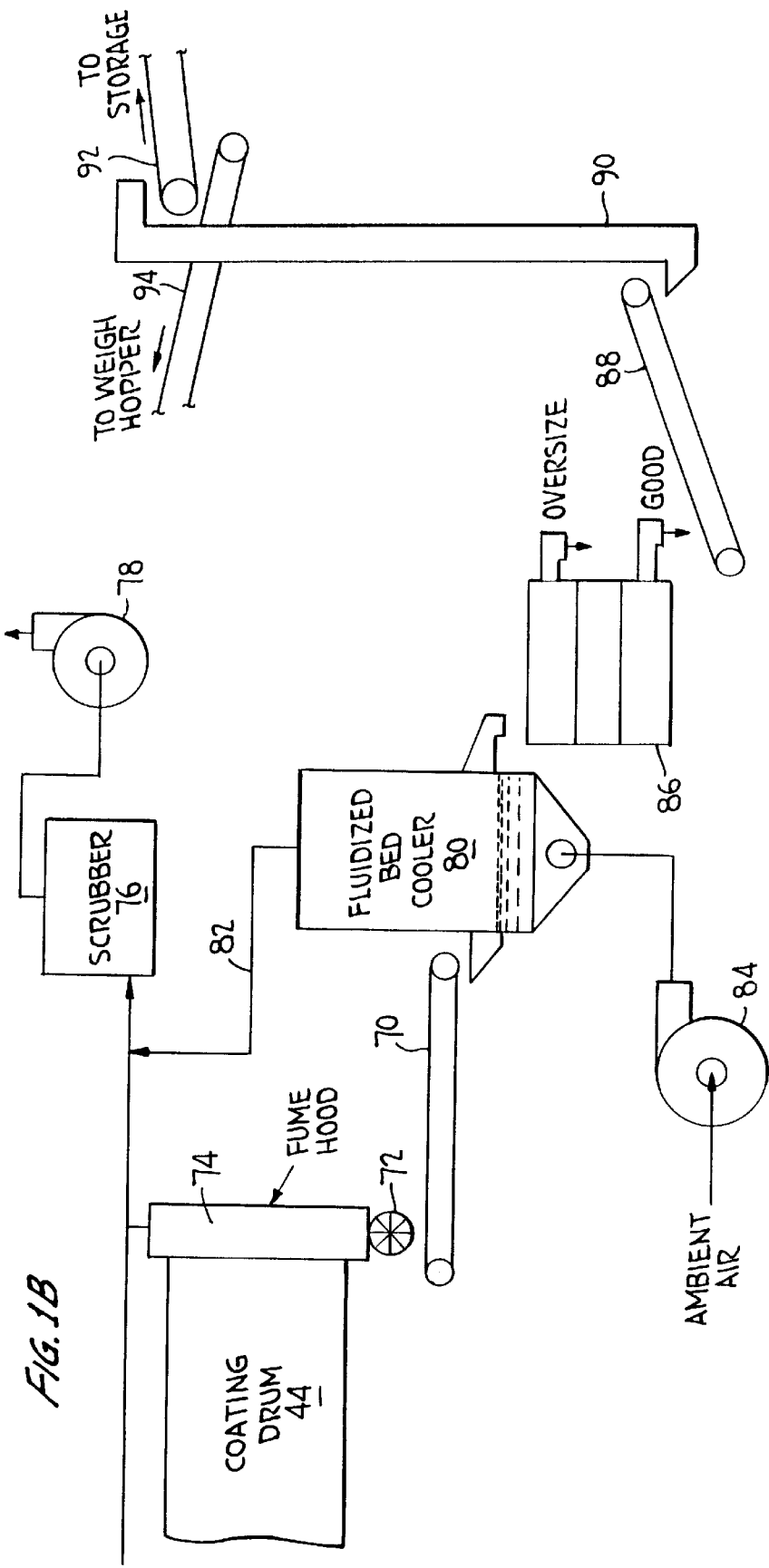

The urea is passed through the coating drum and after being uniformly coated is fed from the coating drum onto a conveyor 70 through rotary air lock gate 72. As shown in FIG. 1B, the end of the coating drum is enclosed in a fume hood 74. The fumes or air from the fume hood 74 are fed to a scrubber 76 for scrubbing before releasing through fan 78 to the atmosphere. The material from the coating drum at a temperature of about 180° F. is fed by conveyor 70 to a fluidized bed cooler 80. Air from the fluidized bed is also passed to scrubber 76 by line 82. In the fluidized bed, the granules are cooled with ambient air circulated with blower 84 to a temperature of approximately 100° F. At this temperature, the materials are fed into a sizer 86, with the oversized material being discharged and the good material being fed to a conveyor 88 which delivers the material onto elevator 90 for carriage to conveyor 92, which delivers the materials to a suitable storage tank, not shown.

During the start-up of the operation, some material is circulated through the system without being coated. This material can be fed from elevator 90 onto a return conveyor 94 for re-delivery of the uncoated material to the weight hopper 24, or if partly coated or the like can be bagged off.

Figure 2:
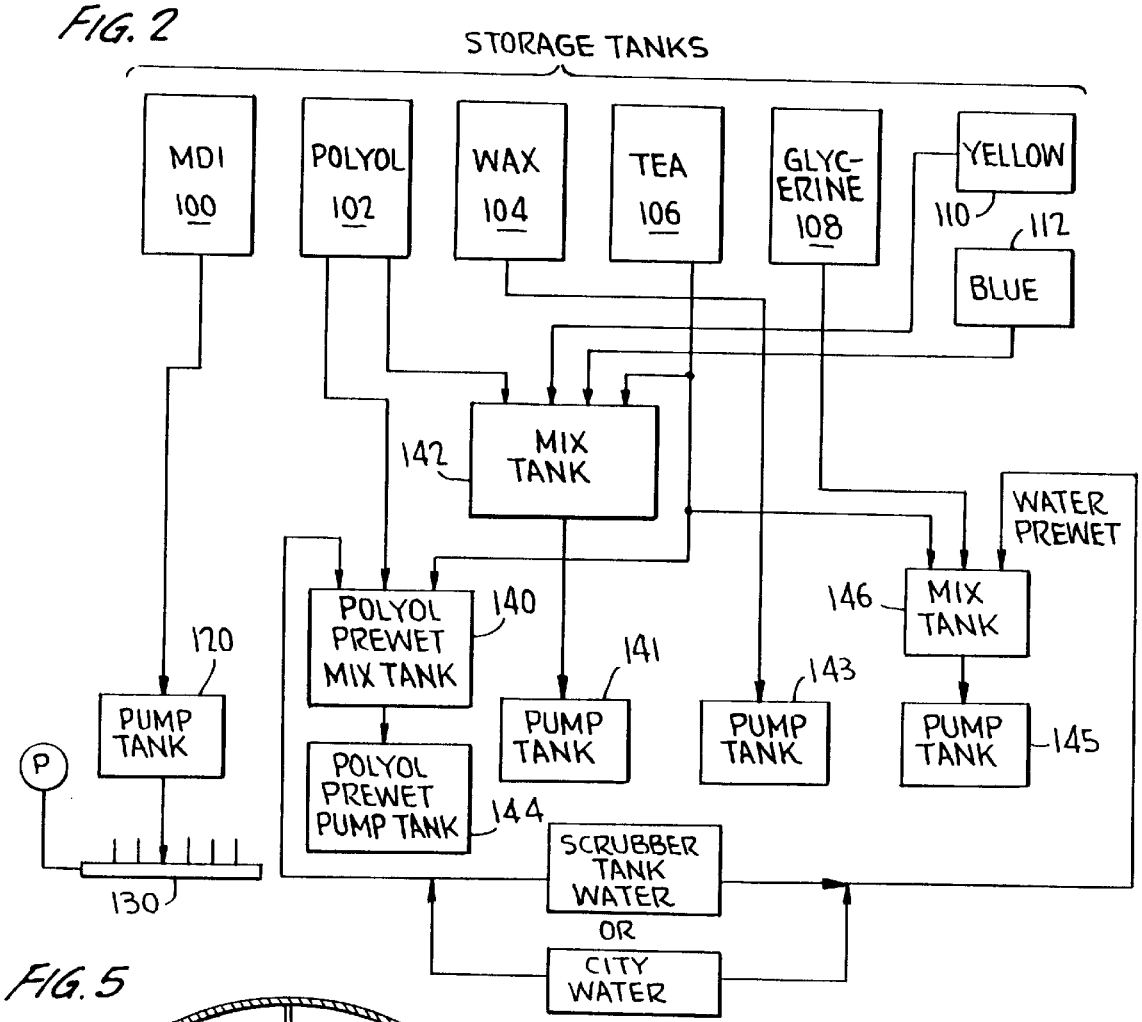
FIG. 2 is a detailed schematic of section A of FIG. 1 illustrating storage tanks for the components used in coating the nutrients as they are fed to an intermediate mix tank, then to a pump tank or directly to a pump tank before being fed to injectors within the coating drum of FIG. 1 through a plurality of piston pumps.

Referring now to FIG. 2, it is seen that the individual coating components used in the coating operation are carried in a plurality of separate storage tanks. Thus, as illustrated in FIG. 2, storage tank 100 contains the coupling agent diphenylmethane diisocyanate (MDI); storage tank 102 contains a polyol, such as a polyethyleneterephthalate polyester polyol; storage tank 104 contains wax, such as a micro crystalline wax; storage tank 106 carries a catalyst such as triethanolamine; storage tank 108 carries a low molecular weight polyol such as glycerine; and storage tanks 110 and 112 carry pigmented materials for coloring the coating, such as yellow and blue pigments to give a green coating.

As also shown in FIG. 2, the MDI is fed directly from the storage tank to a pump tank 120 and then from pump tank 120 to a plurality (26) of individual piston pumps 130. Each piston pump 130, as shown in FIG. 3, separately delivers MDI through a flowmeter 132 to a separate injector 60 in drum 44. The flowmeter controls the preset delivery rate of the MDI from the corresponding piston pump through controller means 134 set at the predetermined delivery rate through a variable speed drive 129. Accordingly, there is a constant and uniform flow of MDI to each of the plurality of injectors 60 carrying MDI located in drum 44.

As further shown in FIG. 2, polyol is fed to mix tank 140. Mix tank 140 additionally receives triethanolamine catalyst from storage tank 106, where it is mixed with the polyol and water to make up the prewet treating solution. Pump tank 144 receives glycerine, triethanolamine and water to make up the prewet treating solution. Similarly to the MDI, the water prewet solution is fed through one piston pump to an injector 60 for injection into the entrance end of rotating drum 44. The prewet mixture is injected through the first injector in line in the rotating drum.

Mix tank 142 receives in addition to polyol from storage tank 102 dye or pigment materials from tanks 110 and 112 and triethanolamine catalyst from tank 106. After mixing in mix tank 142, the mixture is supplied to a pump tank 141 and then to a plurality (13) of piston pumps for delivery through separate flowmeters 132 to drum 44 or 46. Glycerine from storage tank 108, triethanolamine from storage tank 106 and water are fed to mix tank 146 and then to pump tank 145 for feeding separate piston pumps. According to the present invention, as illustrated in FIG. 2, the water used in the pretreatment can be city water or scrubber tank water. By using scrubber water as process water in the pretreatment, the need for disposal of the scrubber water is eliminated, which is an environmental advantage. Optionally, wax from storage tank 104 can be fed to a pump tank 143 and from the pump tank to a plurality (4) of piston pumps for feeding through flowmeters to separate injector 60 in rotating drum 44 or 46.

Accordingly, in the preferred embodiment shown, there will be a total of 45 piston pumps separately delivering coating components to separate injectors 60 arranged in drum 44 or 46 through separate flowmeters 132. In this preferred embodiment, there will be 26 piston pumps delivering MDI to 26 injectors 60 arranged in line and periodically in drum 44; 13 piston pumps delivering a polyol mixture to 13 injectors with the flow separately controlled by separate flowmeters for each injector arranged sequentially in the drum; 4 piston pumps for delivering wax coating to separate injectors 60 in the drum; one piston pump delivering a first prewetting treating solution to a single injector in the drum, and one piston pump delivering a second water catalyst prewet mixture to the piston drum. The number and location of the piston pumps can obviously be varied depending on the coating material ultimately desired. Moreover, as will be apparent, not all of the injectors need be used in any operation. This will depend upon the desired end fertilizer desired, i.e., whether a wax coating is desired on the coated fertilizer granules, and on the thickness desired of the coating on the granular materials.

In the rotating drum as shown in FIGS. 3 and 4, the 45 injectors 60 are arranged in line starting from the entrance end of the drum to the exit end of the drum. The first injectors contain the prewet mix, followed by MDI. Depending upon the number of coatings applied, the additional injectors can be utilized along the length of the drum to inject individual coating components so as to provide additional coatings of the water-insoluble polymer or a separate coating such as wax. Thus, in a typical arrangement the sequence of feed from the entrance end to the exit end of the drum is as follows:

|  |  | Components Fed | Distance from Entrance End |
|---|---|---|---|
| First Layer | Pretreat | Water/Catalyst/Polyol | 1'-0" |
|  | Pretreat | First Polyol/Catalyst/Water | 2'-0" |
|  | MDI | first application | 3'-0" |
| Second Layer | MDI | second application | 3'-6" |
|  | Polyol | second application | 3'-11 3/32" |
|  | MDI | third application | 4'-10 13/16" |
| Third Layer | MDI | fourth application | 7'-4" |
|  | Polyol | third application | 7'-9 3/32" |
|  | MDI | fifth application | 8'-8 13/16" |
| Fourth Layer | Wax | first application | 10'-12 13/16" |

Additional layers of polymer can be applied with each injector at about 1 foot, 11 inch centers. The number of layers will depend on the fertilizer desired.

Figure 5:
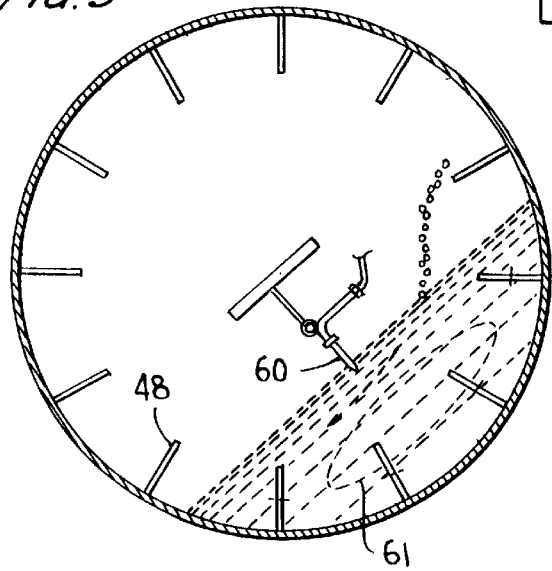
FIG. 5 is a schematic view showing an undesirable eddy effect in the event the granules are not properly rotating.

As earlier indicated, the flight arrangement within the rotating drum is important for uniform application of the coating material. Thus, as best shown in FIGS. 4, 4A and 5, the flights, which are alternately straight and Z-flights, are approximately six inches in height. There is also a ring 45 at the entrance end of the drum which is above the level of the flights and approximately 18 inches. This ring holds the material being coated within and cascading within the drum. There is a second ring 47 at the exit end of the drum about ten inches in height which permits the granules to be discharged at a continuous rate from the drum. Thus, the flights are designed in order that the tumbling of the granules is as shown in FIG. 4 whereby the tip of the individual injectors is slightly below the surface of the top moving layer of the cascading material being coated. The flights cause a circular movement of the material within the drum in order that all of the material while passing through the drum comes into contact with the injectors over the length of the drum. It is important to have the flight arrangement so that there will not be an eddying effect, as shown in FIG. 5 by the broken circular line 61. If an eddy effect is obtained, some of the material being coated will not come into contact with the coating material and, accordingly, the coating will not be uniform. It has been determined that the heights of the flights should be approximately 50% of the bed depth, i.e., the cascading granules, to ensure that all of the granules are lifted from the bed. If the flights are not high enough, the eddy effect of FIG. 5 will be obtained so that in the center of the granule bed the particles will never lift from the bed. As a rule of thumb, the following equation will apply: $H_F > \frac{1}{2} D_B$, wherein $D_B$=bed depth and $H_F$=flight height.

As shown in FIGS. 3 and 4, a flexible line from each piston pump leads into the entrance end of the drum 44 and is arranged on a line carrier 160. From this carrier, each individual line is carried to a support member 162 extending from carrier 160. Support members 162 are arranged along the entire length of the drum except for about the last two and one-half feet of the drum. In this manner, each injector feeds a coating component used in the coating of the plant nutrient with polymer at a different location in the drum.

Figure 6:
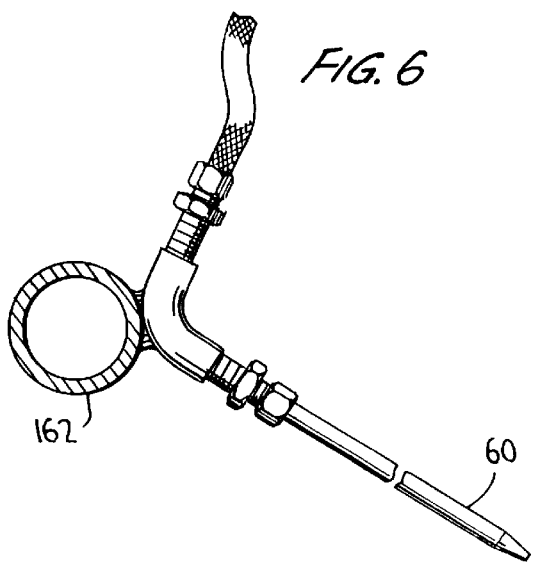
FIG. 6 is an enlarged view of the injectors for injecting the coating component onto the nutrient granules to be coated.

FIG. 6 illustrates in detail an injector 60. As is seen, the injector 60 is at the end of a flexible hose 164 which need not be jacketed. However, it may be desirable to have the line steam jacketed when carrying a high melting wax material, and at times it may be desirable to have the line jacketed up to the outside of the drum when carrying the polyol. The injector shown utilizes a ¼" elbow, suitable tube fittings and a ½" stainless steel tube swaged to a flat tip. This injector is highly suitable in that the injectors are not subject to fouling with the component being carried and/or with the cascading granules or material being coated. Since each injector carries a single component or a mixture of components which are not reactive with each other, there is again less likelihood for any fouling or clumping of material around the injectors.

In a typical operation of the preferred embodiment of the present invention as illustrated in the drawing, the material being coated, i.e., urea, will be fed at a rate of five thousand pounds per hour. This five thousand pounds of urea will be coated in the rotating drum with a first prewet solution comprising 70% water, 20% glycerine and 10% triethanolamine catalyst at a rate of approximately 25 pounds per hour. The second prewet solution comprising 81% polyol, 9% triethanolamine catalyst and 10% water will be fed at a rate of approximately 12.5 pounds per hour. The MDI in the first coating will be fed at a rate of 16.67 pounds per hour. Thereafter, the additional layers of the reactive coating material can be applied as desired.

As is apparent, while the present invention has been defined with respect to a plurality of injectors for application of a plurality of coatings, it is not necessary to use all of the injectors to provide the particulate slow release fertilizer. This will depend upon the end use application. Moreover, although the invention has been defined primarily with respect to using urea as the plant nutrient, any of the plant nutrients such as defined in the '659 and '403 patents can be utilized. Similarly, any of the coupling agents and coating materials defined in the aforesaid patents can be used in the machine system and process. With respect to the prewet solution, the catalyst utilized and the low molecular weight polyol can vary, again depending upon the other components used and the end application. For example, if a different coupling agent is selected, it may be desirable to use a different catalyst. These modifications in the system will be apparent from the teaching of the aforesaid '659 and '403 patents. Similarly, as will be apparent to one skilled in the art, various modifications can be made within the scope of the aforesaid description. Such modifications being within the ability of one skilled in the art form a part of the present invention and are embraced by the appended claims.

It is claimed:

1. A machine system for coating a granular material with a polymer coating comprising means for rotating said granular material to provide a cascading flow of said granular material including a top moving layer, means for injecting at least one coating component of said polymer coating into said cascading granular material at said top moving layer of said cascading granular material, and means for recovering said coated granular material.

2. A machine system for coating a granular material with at least one water insoluble polymer sealing layer comprising means for rotating said granular material to be coated to provide a cascading flow of said granular material including a top moving layer, means for injecting a plurality of coating components separately into said cascading granular material at said top moving layer of said granular material, said injection means including an injector and in flow communication with means for individually controlling the flow rate of each of said plurality coating components to said injector, and means for recovering said coated granular material.

3. The machine system of claim 2 wherein said means for controlling said flow rate is a flow meter.

* * * * *